July 30, 1957  E. P. LEAHY ET AL  2,801,062
SPOOL SYSTEM FOR DEPLOYMENT OF PARACHUTES FROM AIRCRAFT
Filed May 9, 1955  11 Sheets-Sheet 1

INVENTORS
Elizabeth P. Leahy
Osmund A. Leahy

BY *Lancaster, Albous & Common*
ATTORNEYS

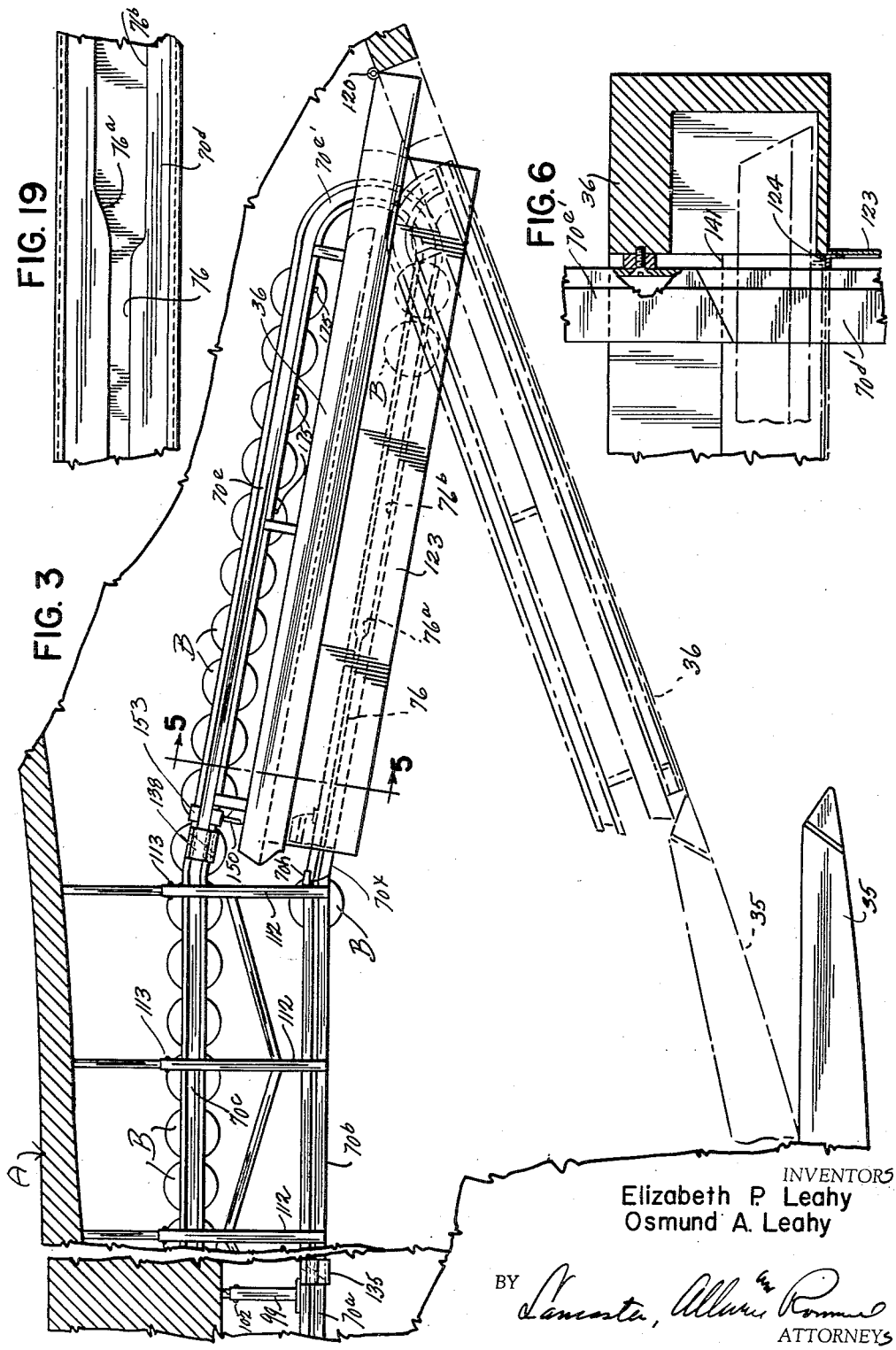

July 30, 1957  E. P. LEAHY ET AL  2,801,062
SPOOL SYSTEM FOR DEPLOYMENT OF PARACHUTES FROM AIRCRAFT
Filed May 9, 1955  11 Sheets-Sheet 3
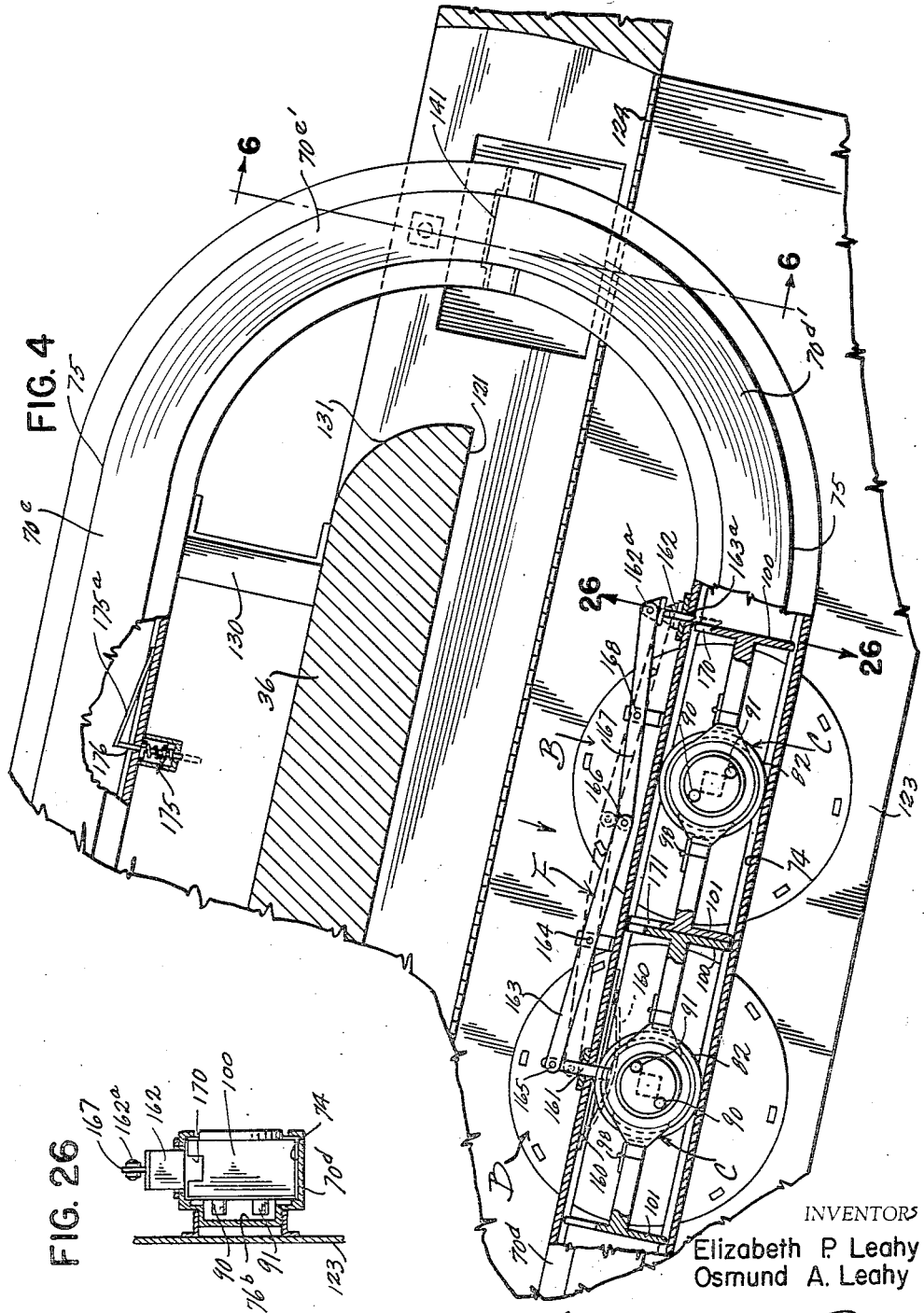
INVENTORS
Elizabeth P. Leahy
Osmund A. Leahy
BY
ATTORNEYS July 30, 1957 E. P. LEAHY ET AL 2,801,062
SPOOL SYSTEM FOR DEPLOYMENT OF PARACHUTES FROM AIRCRAFT
Filed May 9, 1955 11 Sheets-Sheet 4

INVENTORS
Elizabeth P. Leahy
Osmund A. Leahy

BY
ATTORNEYS

FIG. 8
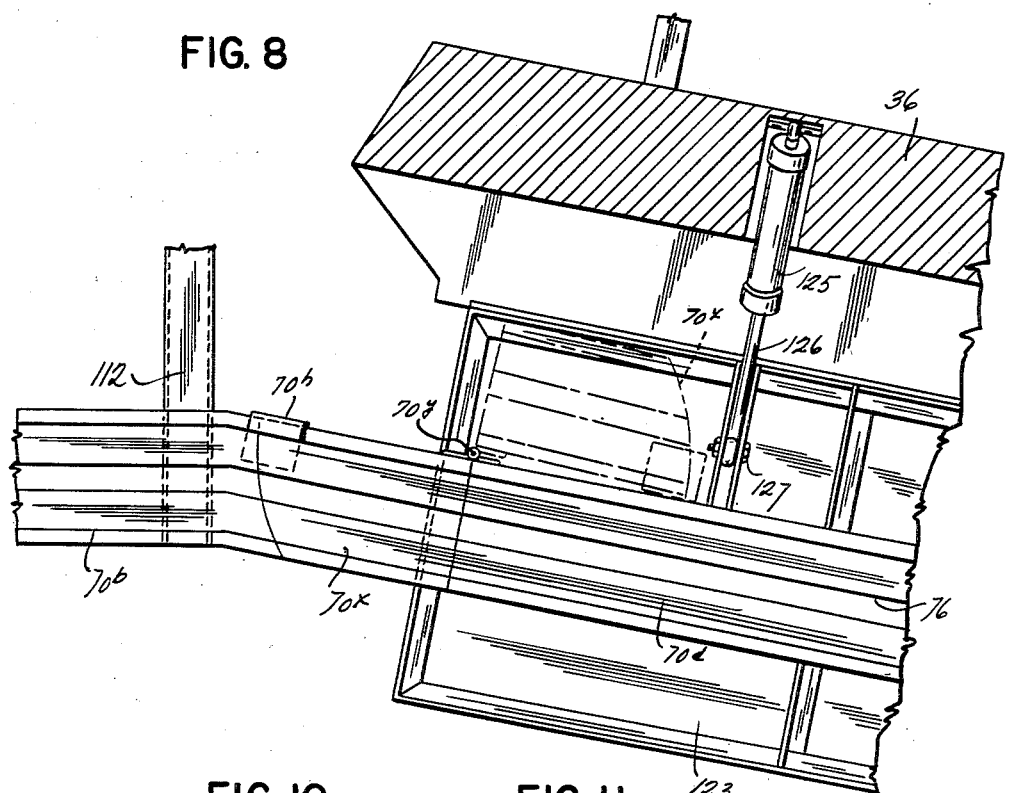
FIG. 10    FIG. 11    FIG. 12
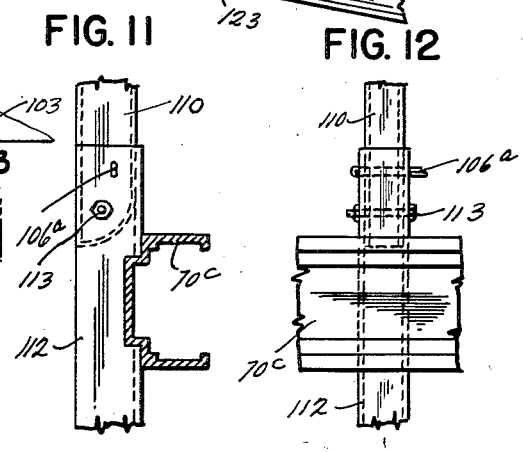
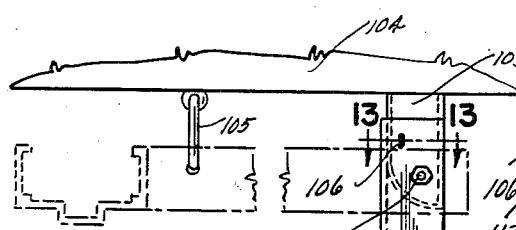
FIG. 13
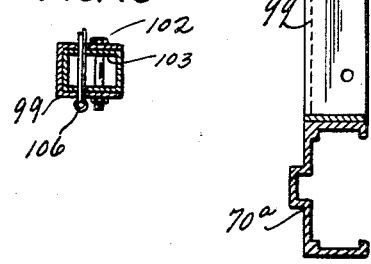
INVENTORS
Elizabeth P. Leahy
Osmund A. Leahy
BY
ATTORNEYS

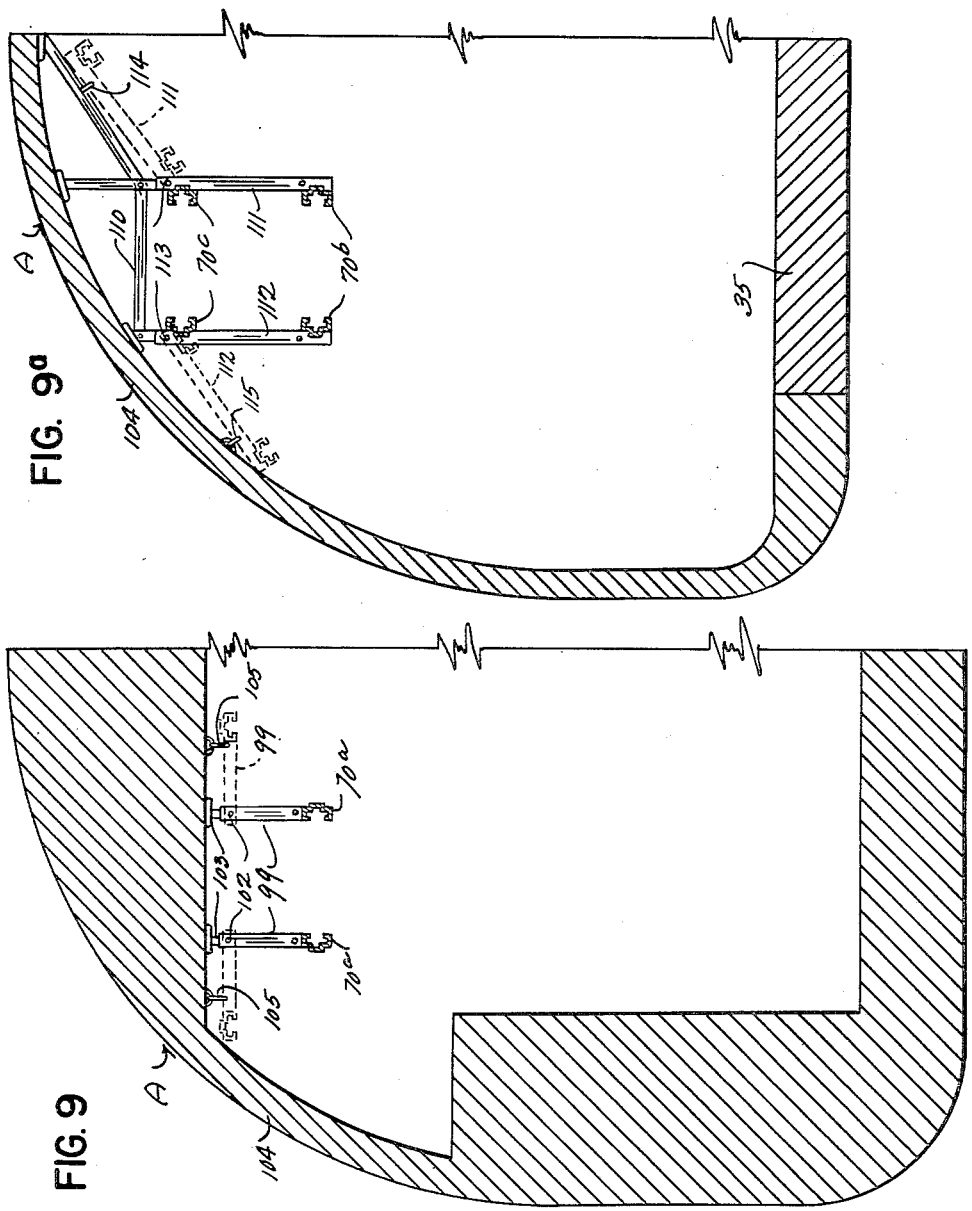

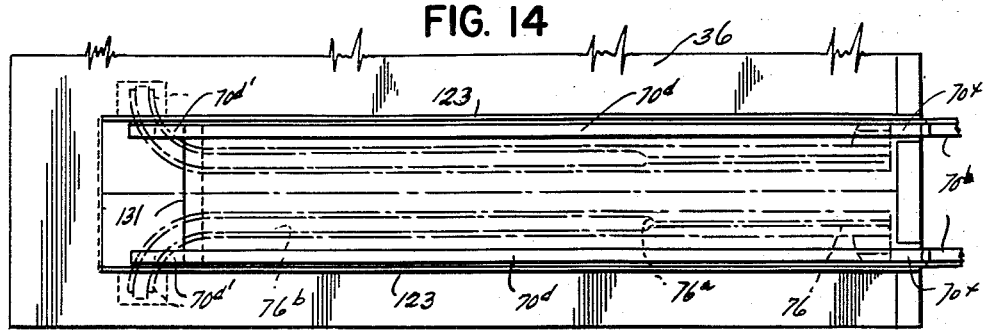
FIG. 14
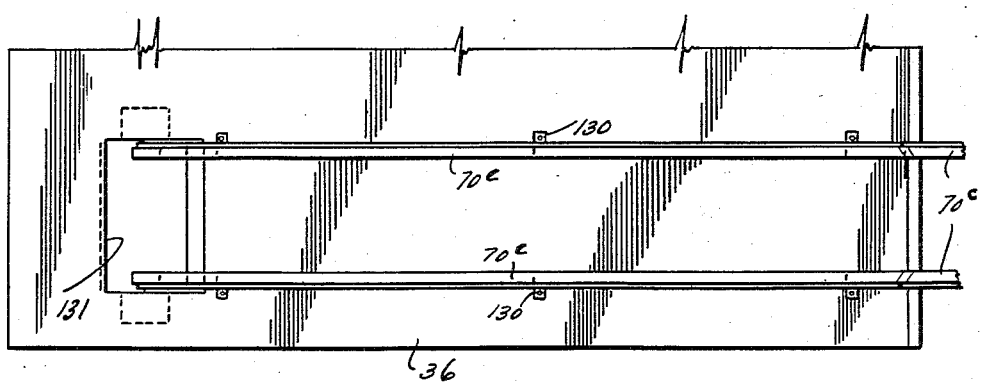
FIG. 14ᵃ
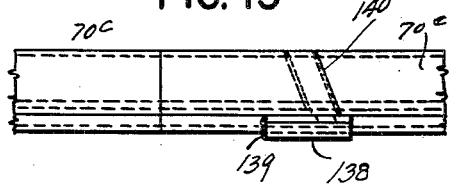
FIG. 15
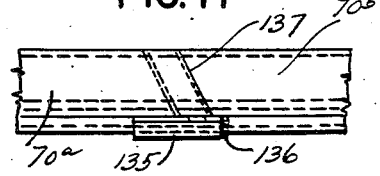
FIG. 17
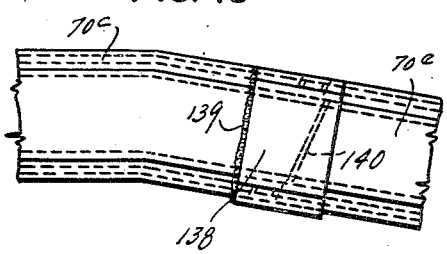
FIG. 16
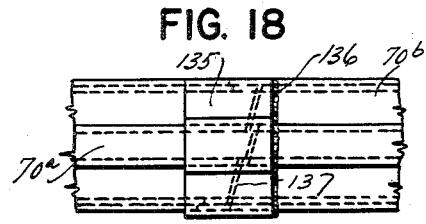
FIG. 18
INVENTORS
Elizabeth P. Leahy
Osmund A. Leahy
ATTORNEYS July 30, 1957 E. P. LEAHY ET AL 2,801,062
SPOOL SYSTEM FOR DEPLOYMENT OF PARACHUTES FROM AIRCRAFT
Filed May 9, 1955 11 Sheets-Sheet 8
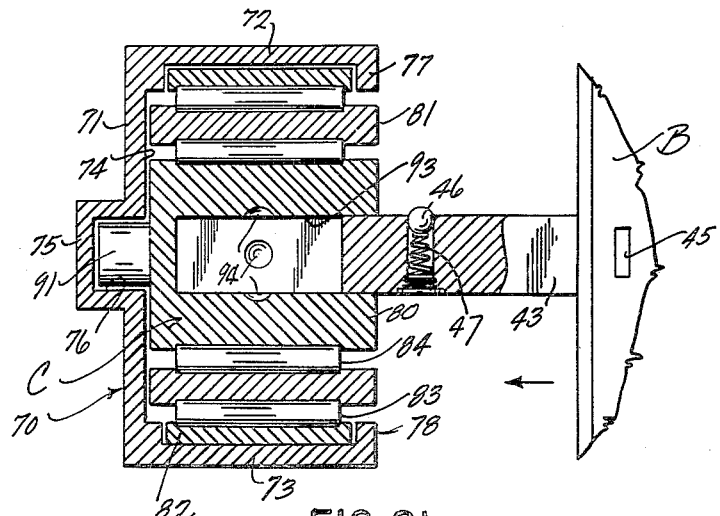
FIG. 20
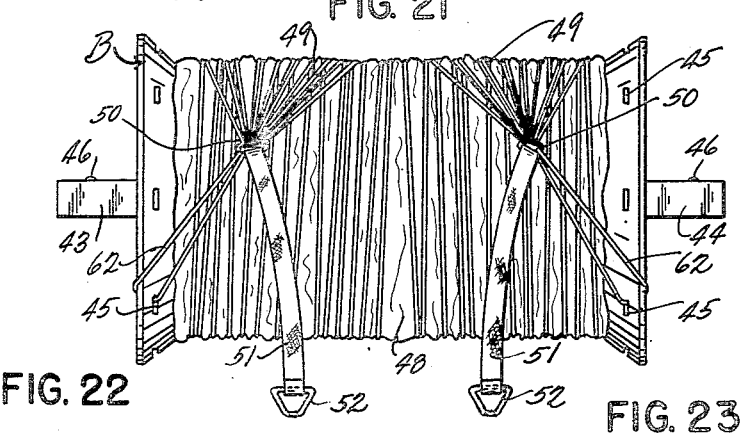
FIG. 21
FIG. 22
FIG. 23
INVENTORS
Elizabeth P. Leahy
Osmund A. Leahy
BY *Lancaster, Alberi & Romme*
ATTORNEYS July 30, 1957 E. P. LEAHY ET AL 2,801,062
SPOOL SYSTEM FOR DEPLOYMENT OF PARACHUTES FROM AIRCRAFT
Filed May 9, 1955 11 Sheets-Sheet 9
FIG. 24
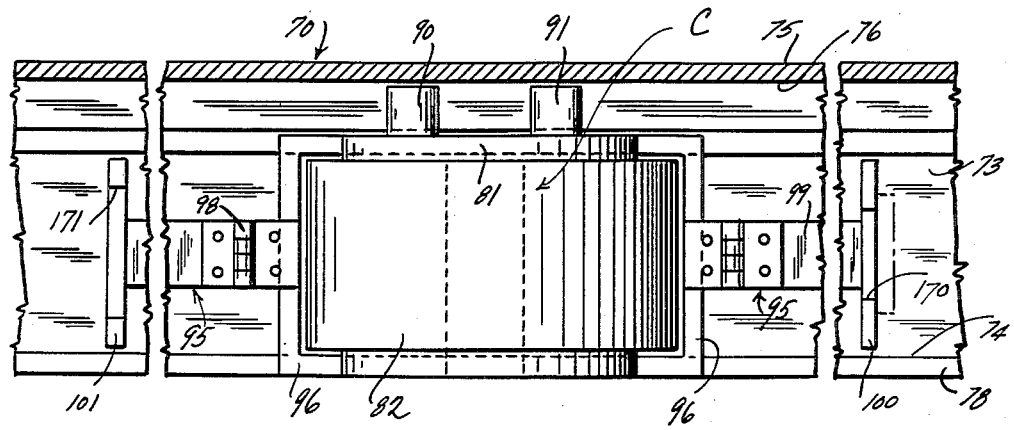
FIG. 25
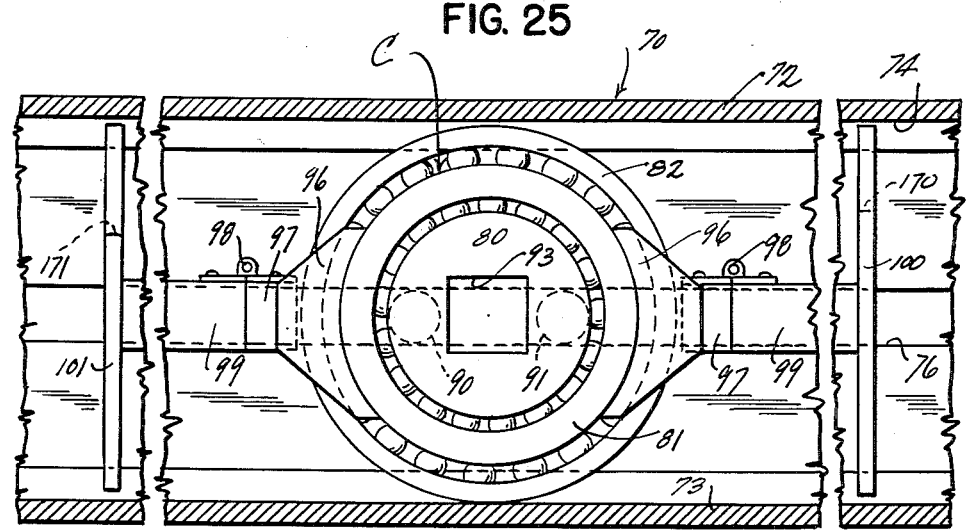
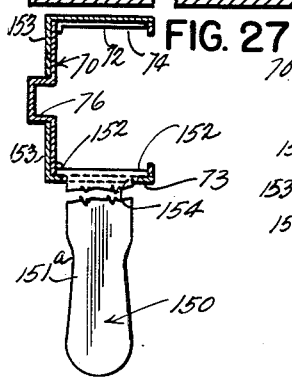
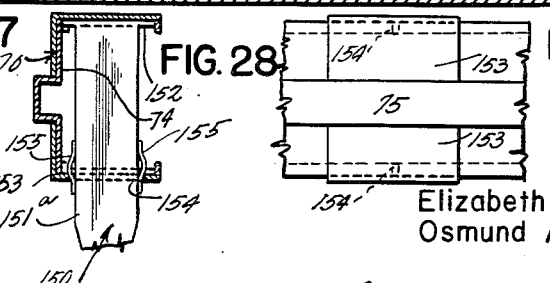
INVENTORS
Elizabeth P. Leahy
Osmund A. Leahy
BY
ATTORNEYS July 30, 1957 E. P. LEAHY ET AL 2,801,062
SPOOL SYSTEM FOR DEPLOYMENT OF PARACHUTES FROM AIRCRAFT
Filed May 9, 1955 11 Sheets-Sheet 10

INVENTORS
Elizabeth P. Leahy
Osmund A. Leahy

BY *Lancaster, Allwine Rommel*
ATTORNEYS

July 30, 1957 E. P. LEAHY ET AL 2,801,062
SPOOL SYSTEM FOR DEPLOYMENT OF PARACHUTES FROM AIRCRAFT
Filed May 9, 1955 11 Sheets-Sheet 11

INVENTORS
Elizabeth P. Leahy
Osmund A. Leahy

BY
ATTORNEYS

United States Patent Office 2,801,062
Patented July 30, 1957

2,801,062

SPOOL SYSTEM FOR DEPLOYMENT OF PARACHUTES FROM AIRCRAFT

Elizabeth P. Leahy and Osmund A. Leahy, Manila, Republic of the Philippines

Application May 9, 1955, Serial No. 507,033

15 Claims. (Cl. 244—147)

This invention relates to improvements in systems for deployment of parachutes from aircraft for the dropping of personnel and cargo.

A primary object of this invention is the provision of a reliable and safe system for deployment of parachutes from aircraft in which spools are used for supporting the canopies under such circumstances that personnel or cargo loads may be quickly and safely discharged from an airplane in flight.

A further object of this invention is the provision of an improved spool system for compactly supporting parachute canopies, in which the canopy spool is supported by trackways in convenient position for attachment to troops or personnel, and in which the individuals have added comfort in that they are not required to support the weight of a main parachute pack during flight.

A further object of this invention is the provision of a spool system for deployment of parachute canopies from aircraft in which the problem of parachute canopy packing is materially simplified over standard practice, with a reduction in the number of components of the parachute assembly and in the need for expendables used in the packing of personnel and cargo parachutes.

A further object of this invention is the provision of an improved system for deployment of drogue parachute canopies for braking aircraft landing speed.

A further object of this invention is the provision of an improved system for deployment of parachute canopies in which the requirement for personnel parachute doors at the rear of the transport plane is eliminated.

Other objects and advantages of this invention will be apparent during the course of the following detailed description.

In the accompanying drawings, forming a part of this specification, and wherein similar reference characters designate corresponding parts throughout the several views:

Figure 3 is a fragmentary cross sectional view taken through a portion of the tail assembly of a transport airplane, showing an arrangement of spools and trackways.

Figure 4 is an enlarged fragmentary cross sectional view through the rearmost portion of the trackway or all arrangement of the system showing it in extended position.

Figure 6 is a transverse cross sectional view taken substantially on the line 6—6 of Figure 4, and more particularly showing a joint connection of movable and fixed portions of a trackway or rail system mounted upon the airplane cargo door.

Figure 8 is a fragmentary view, partly in section, showing the juncture connection of certain portions of the track system.

Figure 9 is a transverse cross sectional view through half of the airplane fuselage approximately at the location of line 9—9 on Figure 1 of the drawings, and showing the left trackway system.

Figure 9a is a transverse cross sectional view taken substantially on the line 9a—9a of Figure 1, and showing the left trackway system above the ramp of the aircraft.

Figure 10 is a fragmentary view, partly in section, showing the pivoted mounting of the rail supporting brackets used in the trackway system.

Figure 11 is a fragmentary sectional view showing the foldable rail mounting of the trackway system in the rear portion of the airplane.

Figure 12 is a fragmentary side elevation of the details shown in Figure 11.

Figure 13 is a cross sectional view taken substantially on the line 13—13 of Figure 10, and more particularly showing the means of releasably locking the bracket arms for the trackways in extended position.

Figure 14 is a fragmentary bottom plan view of one side of a track system as used on the cargo door; the tracks being shown in full lines in extended position in their aligning relation with respect to the fuselage attached complementary portion of the trackway, and the dot and dash lines showing the folded and collapsed position of the tracks upon the cargo door.

Figure 14a is a top plan view of the cargo door, showing the one side track on top of the door in aligning relation with the complementary fuselage attached trackway portions.

Figure 15 is a fragmentary plan view of a reenforcing detail for holding the tracks in reinforced and aligning relation at a track joint.

Figure 16 is a side elevation of the detail shown in Figure 15.

Figure 17 is a plan view of another reenforcing detail at the joint juncture of aligning tracks.

Figure 18 is a side elevation of the detail shown in Figure 17.

Figure 19 is a fragmentary side elevation of a track, showing the track passageway or channel where it widens to permit the canopy packed spools to start rotating for parachute canopy deployment.

Figure 20 is a transverse cross sectional view taken through one of the tracks, showing a trolley or carriage rotatably mounted therein, and showing in fragmentary relation a spool with a portion of its axle about to be inserted into the trolley or carriage.

Figure 21 is a view showing the spool with a parachute canopy packed or wound thereon, and the details of the spool being in such condition after packing that the spool is ready for attachment to its supporting trolleys or carriages.

Figure 22 is a fragmentary plan view showing a pair of tracks and the manner in which an empty spool is mounted thereon.

Figure 23 is an enlarged transverse cross sectional view taken through the spool cylinder; the view being taken on the line 23—23 of Figure 22.

Figure 24 is a fragmentary plan view, partly in section, showing a trolley mounted in a rail or track.

Figure 25 is a fragmentary view, partly in section, showing the details of Figure 24 in side elevation.

Figure 26 is a fragmentary cross sectional view taken through a portion of the spool control mechanism, substantially on the line 26—26 of Figure 4.

Figure 27 is a fragmentary transverse cross sectional view taken through one of the rails, showing a certain type of spool stop, in an inoperative position.

Figure 28 is a view similar to Figure 27, but showing the stop in operative position for limiting the stopping of travel of spools along the rails.

Figure 29 is a fragmentary side elevation showing the reenforcement of the rails at the location of the stop of Figures 27 and 28.

Figure 31:
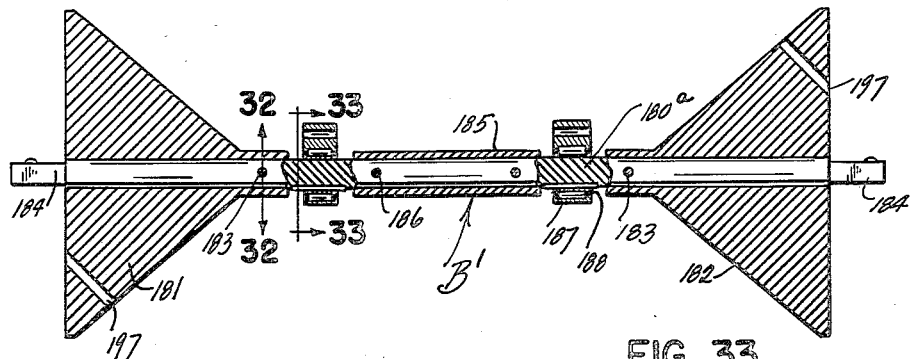
Figure 31 is an axial cross sectional view taken through the spool of the drogue canopy.
Figure 32:
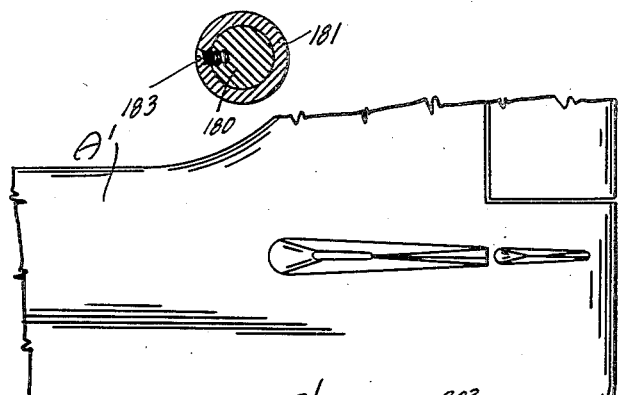
Figure 33:
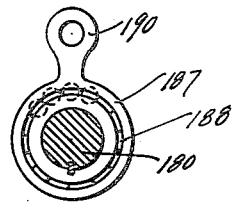

Figures 32 and 33 are transverse cross sectional views taken substantially on their respective lines 32—32 and 33—33 shown in Figure 31 of the drawings.

Figure 34:
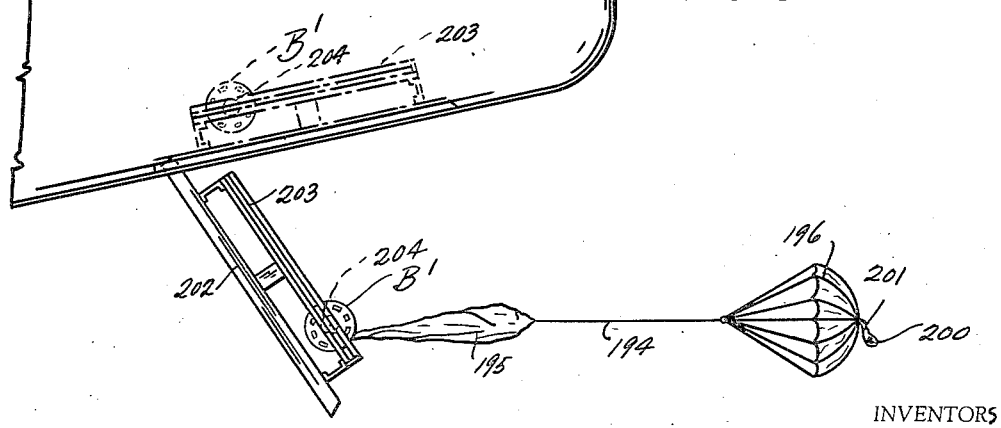

Figure 34 is a rather diagrammatic view showing the manner in which the drogue canopy is deployed from the spool off a rail system provided on an aircraft closure.

In the drawings, wherein for the purpose of illustration are shown different forms of the invention, the letter A may generally designate an aircraft, which in the present case is a transport airplane. The spools B are adapted to be used in connection with trolleys or carriages C along which the latter are guided by an improved trackway system D installed in the aircraft and which may vary appreciably for different types of aircraft.

Figure 1:
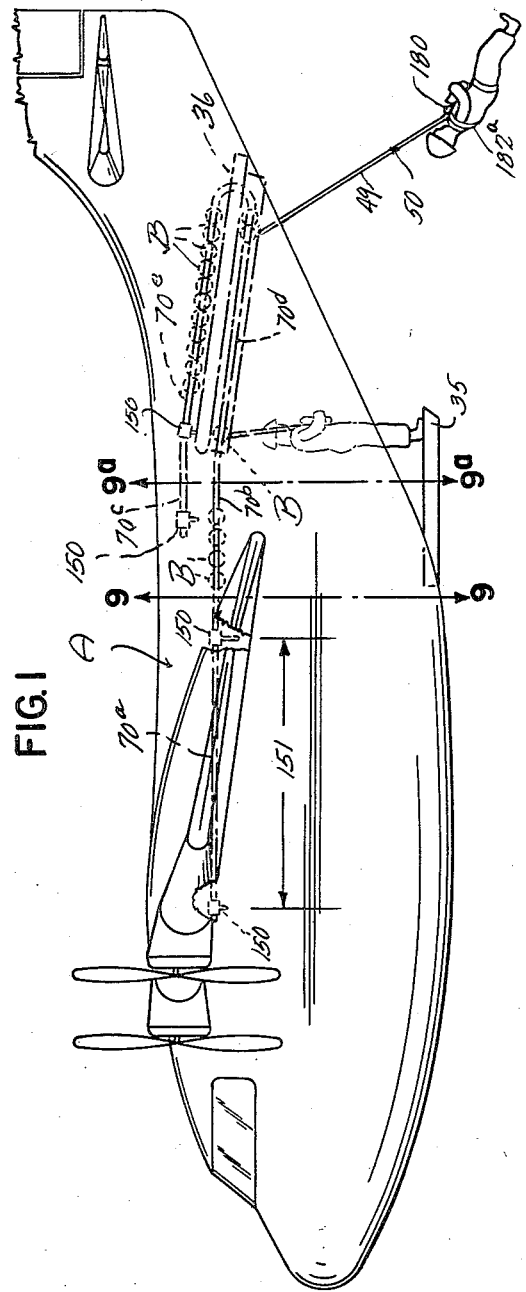
Figure 1 is a side elevation of a transport airplane showing diagrammatically the relative position of trackways and spools, and the manner in which parachutists are dropped from the airplane.

The aircraft A, as shown in Figure 1, is of a transport airplane type. In the C–123 and C–130 Transport Airplanes used by the United States military forces, for troop deployment, there are two side lanes of travel, extending fore and aft. The troops sit along each lane, facing each other. With this type of airplane there is used a forwardly hinged ramp 35, and a rearwardly hinged cargo door 36. The ramp and the cargo door form the rear closure arrangement for the aircraft; the ramp 35 when extended for jumping being positioned substantially as shown in Figure 1, and the cargo door 36 opening upwardly within the fuselage. In the drawings of the present application only one side trackway system has been shown, that at the left side of the airplane, but it is to be understood that a duplicate right hand rackway system for jumpers is provided at the other side and that other lanes of jumping and trackway system may be provided as desired.

Referring to the spool assemblage B, the same is particularly shown in Figures 20 to 25 inclusive.

In general, for troop jumping and cargo dropping, the canopy is wound spirally upon the spool starting with the apex and under regulated tension.

The spool comprises a tubular cylinder portion 40 having the tapered end flanges 41 and 42 connected fixedly therewith, as shown in Figure 22. The spool may be of any approved material and is preferably hollow. Endwise axial extensions 43 and 44 (Figure 21) project in the line of the spin axis of the spool. A single removable axle may be provided, connected in any approved manner non-rotatably upon the spool, or the flanges 41 and 42 may have the axle extensions 43 and 44 fixed thereto. The frusto-conical shaped flanges 41 and 42 are provided with outer edge slots 45 therein for receiving safety ties or break cords in a manner to be subsequently described. The axle extensions 43 and 44 are preferably square in cross section and they are provided with depressible detent balls 46 (Figure 20) spring loaded at 47 so as to have a segmental portion thereof projecting above a side surface of the axle for socketing the axle in proper position within the carriage or trolley C provided therefore, in order to properly endwise space the spool with respect to the trackways and the trolley.

Figure 2:
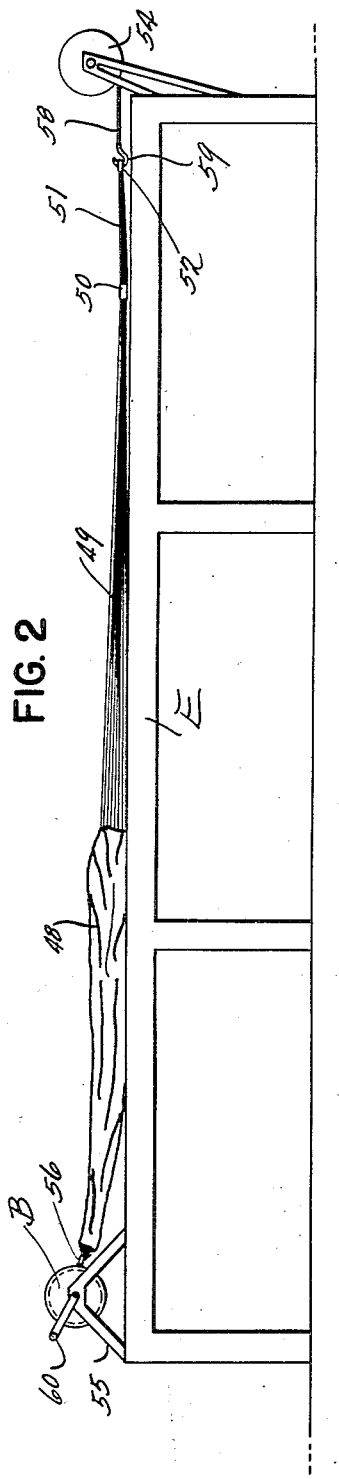
Figure 2 is a rather diagrammatic view showing the method of winding a parachute canopy upon an improved type of spool used in the system for deploying of parachutes from aircraft.

A packing table E is provided (Figure 2), upon which the canopy 48 and shroud lines 49 are stretched. The canopy is transversely folded so that the width of the fold approximates the width of the spool. The shroud lines 49 are separated into two groups, as is usual for ordinary container packing, and as shown in Figure 2 the two groups at their ends are provided with connector rings 50 to which are attached riser webs 51. The latter are provided with connector pieces 52 at their ends which hang free for attachment to suitable connectors upon the wearer's harness, in a manner well understood in this art.

On the packing table E a standard tension drum 54 is located. It is rotatably mounted upon the table. At the opposite end of the table a suitable rack or bracket structure 55 is provided for receiving the axle extensions of the spool in order that the spool can be rotated. Bridle loop 56 at the apex of the canopy is loosely and freely fitted into the opening or recess 57 (Figure 23) in the cylinder or hub of the spool B. The canopy and shroud lines are then pulled tight. The desired tension is set on the drum 54. The two drum cables 58 are then pulled out from the drum and the hooks 59 thereof are engaged with the riser web connector pieces 52. A crank 60 is releasably fitted to one of the axle extensions of the spool. It is rotated clockwise and the canopy A and shroud lines 49 are wound upon the spool B under tension. It is to be understood that the cables 58 extend as the canopy structure is wound upon the spool. Prior to releasing the cable hooks from the canopy release couplings 52 break cords or safety ties 62, as shown in Figure 21, are tied between the connector links 50 of the shroud lines and looped through the slots 45, in order to retain the tension in the canopy wound upon the spool after release of the hooks 59. The spool B is now packed and it is removed from the rack and table. It is to be noted that the suspension webs 51 hang loose. From the foregoing it will be apparent that the spool type of packing is a material time saver over the conventional container packing for parachutes.

The rails of the track system are provided in pairs for supporting the spools B. Trolleys C are positioned in each axle extension of a spool B and the spool bridged between the two rails, with the trolleys riding in said rails. These rails, generally designated at 70, are best shown in Figure 20. They are each of channel shaped cross section; including an outer side wall 71 and bottom walls 72 and 73 providing a channel runway 74 wherein the trolleys roll. The rear wall 71 has an outwardly projecting integral channel shaped extension 75, defining a runway 76 for receiving certain dog portions of the trolleys or carriages C, to be subsequently described. The runway 76 opens into the trolley runway 74 of the rail structure. Top and bottom flanges 77 and 78 are provided upon the walls 72 and 73 respectively, extending inwardly over the upper and lower portions of the passageway 74, for retaining the trolleys or carriages against lateral removal from the rails, at the spool side of the same.

The passageway or runway 74 facing the flanges 77 and 78 is reduced in width for receiving a certain ring portion of the trolley to be subsequently described.

Two trolleys C are provided for each spool B; one for positioning upon each shaft extension 43 and 44. Each trolley comprises an inner cylindrical portion 80; a middle ring 81, and an outer ring 82. Suitable anti-friction rollers or bearings 83 are positioned between the middle ring 81 and outer ring 82 and similar anti-friction bearings 84 are positioned between the middle ring 81 and central cylinder 80. The latter, at its end opposite the spool attaching end, is provided with a pair of eccentric dog projections 90 and 91, as is shown in Figures 4 and 24 of the drawings. These projections are preferably cylindrical and ride in the rail runways 76 in order to prevent rotation of the spools B when riding in the narrow portions of said runways 76.

The central ring or cylinder 80 is provided with an axial passageway 93 therein opening at the spool side of the rail for detachably receiving a trolley shaft extension 43 or 44, as the case may be. These passageways 93 are square or polygonal in cross section. They snugly and slidably receive the shaft extensions in non-rotatable rotation. Each surface of the passageways 93 is provided with a socket 94 for receiving the spring loaded ball detent 46.

It will be noted that the outer ring 82 rides in the narrow portions of the trolleyway 74 of the rails, facing the flanges 77 and 78. Anti-friction bearings are socketed in the ring portions. All of this holds the position of the trolley between the rails. The middle and outer rings 81 and 82 roll freely upon their anti-friction mountings, and only the central cylindrical ring or portion 80 is held against rotary movement so long as the eccentric projections or dogs 90 and 91 ride in the narrower portions of the runways 76.

The trolleys or carriages C must follow each other at regulated spaced intervals in order to prevent relative interference, and improper spacing between the spools. To that end the outer ring 82, is narrower than the middle ring 80, so that the latter projects at both ends for receiving buffer and spacing extensions 95, both forwardly and rearwardly of the trolleys. These are shown in Figures 24 and 25 of the drawings. Each of the same includes a stirrup or bracket portion 96 straddling the outer ring 82 and fixed to the over hanging portions of the middle ring 81, as is shown in Figure 24. The brackets 96 have endwise rod extensions 97 hingedly connected at 98 to endwise aligning rods or extensions 99 fixed upon buffer heads 100 and 101. The buffer heads 100 and 101 may be of any approved material, even some shock absorbing construction if desired. The hinges 98 enable the trolleys C to make turns in the trackway system, should such be necessary, depending upon the nature of the system used in the airplane. These hinges may be operated upon horizontal or vertical axes. In the present instance the axes are horizontal and enable the trolleys to make turns in the trackway system, such as at the turn location shown in Figure 4.

The matter of arrangement of rails and trackways in the aircraft may suit the structure of the aircraft. By way of illustration, certain conventional portions of a transport airplane have been shown. The trackway system is duplicated at each side of the longitudinal center of the fuselage. Each line includes complementary front rail portions 70ª shown in Figures 1 and 9. This mounting preferably includes rail portions 70ª in complementary relation supported upon suspension brackets 99 pivoted at 102 upon suitable ceiling brackets 103 attached to the fuselage framework 104 of the aircraft, in order that the supporting arms 99 extend vertically or be collapsed laterally in an outward direction, as indicated by the dotted lines in Figure 9. The supporting arms 99 may be locked in extended operative position by detachable cotter pins or keys 106, shown in Figures 10 and 13. They extend through suitable aligned openings in the arm 99 and bracket 103. The key 106 must be removed in order to collapse the rails and their supporting arms. In collapsed position suitable hooks 105 may be provided for holding the arms 99.

In order that the parachutist may move outwardly upon the extended ramp to a jumping position where he may safely jump with assurance that his spool will function properly, for the type of airplane having a ramp and a cargo door, hinged as above described, we prefer to use, rearwardly beyond the rail portions 70ª, a bracket structure such as shown in Figures 3 and 9ª and elsewhere for supporting complementary rails 70ᵇ adapted to rearwardly align with the rails 70ª. This supporting structure also includes spool rails 70ᶜ for return of the empty spools after the parachutist has jumped. This supporting structure may include a fuselage attached fixed bracket structure 110 to which bracket arms 111 and 112 are pivoted, at 113, at a location above the rails 70ᶜ. The fuselage 104 may be provided with suitable hooks 114 and 115 for supporting the arms 111 and 112 in collapsed or folded positions. Of course the bracket arms 111 and 112 are locked in operative position by the cotter pin or other key means, such as shown at 106ª in Figure 11.

In order to permit troop personnel to properly jump through the rear opening of a transport airplane, we deem it desirable to mount portions of the rails upon the cargo door 36. To that end and with particular reference to Figures 3 to 7 inclusive, 14 to 19 inclusive, and Figure 26, the cargo door 36 is hinged as at 120 (Figure 3). In this view the cargo door 36, in closed position, is shown in dotted lines, and in open position it is shown in full lines. Suitable hydraulic means (not shown), of conventional construction, is used for operating the ramp 35 and the cargo door 36, to hold them in various closed or opened positions.

Figure 5:
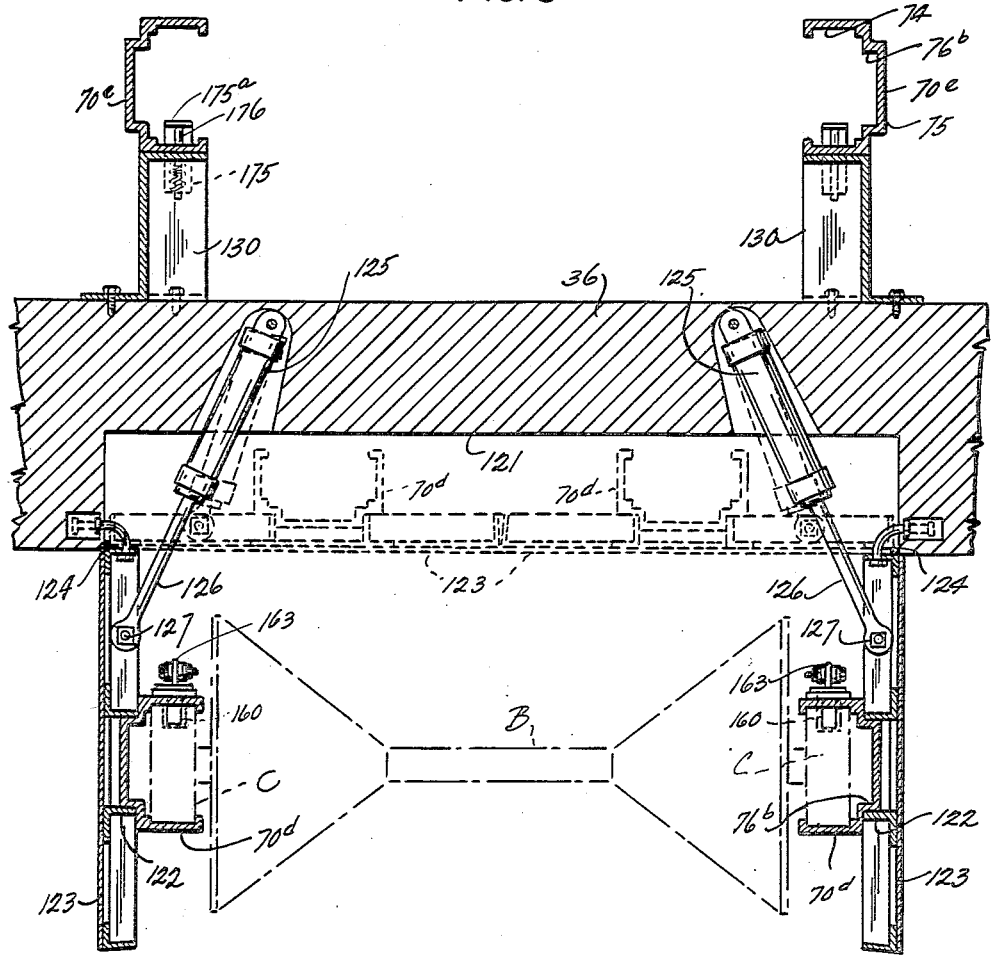
Figure 5 is an enlarged transverse cross sectional view taken substantially on the line 5—5 of Figure 3, and more particularly showing the rear lower trackway system as mounted upon the cargo door of an airplane.

Cargo door 36 is recessed at 121 in its underside, to provide a chamber for collapsibly receiving the bottom track or rail portions 70ᵈ which are adapted to align with the bottom rail portions 70ᵇ of the track structure. The rails or tracks 70ᵈ are supported by suitable bracket means 122 upon closure doors 123 hinged at 124 on the underside of the cargo door 36 as shown in Figure 5. These closure doors 123 swing upwardly to close off the compartment 121 and when they are extended downwardly they hang vertically in properly spaced position, for supporting trolleys C and their spools B as is shown in dot and dash lines in Figure 5. The means for regulating the opening and closing and proper spacing of the doors 123 is preferably a hydraulic or pneumatic system including cylinders 125 pivoted upon the cargo door 36 and having pistons therein and piston rods 126; the latter being pivoted at 127 upon the doors 123 below their hinges 124.

The upper side of the cargo door 36 is preferably provided with complementary rail or track portions 70ᵉ adapted for track alignment with the rail portions 70ᶜ above described, and shown in Figure 9ª and elsewhere for return of the empty spools. These rails 70ᵉ are supported upon fixed brackets 130 bolted or secured on the upper surface of the cargo door 36 as shown in Figure 5 and elsewhere.

It will be noted from Figures 1, 3 and 4 that the rearmost portions of the track system constitutes a turn or bend of 180°, in order that the spools and trolleys may travel from the position of discharge of the parachute canopy onto the return track system. To that end each rail 70ᵈ has a 90° bend as shown in 70ᵈ' (Figure 4) and the rails 70ᵉ each have a 90° bend at 70ᵉ'. The cargo door 36 is provided with an opening or passageway 131 therethrough in order that these bends 70ᵈ' and 70ᵉ' may be extended into operating aligned position therethrough, as shown in Figure 4. Passageway 131 is completely closed to the outside when cargo door closures 123 are shut.

Rails 70ᵈ have complementary portions 70ˣ at their rear ends, hinged at 70ʸ on the cargo door for alignment with the rails 70ᵇ. These portions 70ˣ may be collapsed into the compartment of the cargo door, as shown in dot and dash lines in Figure 8.

In order to hold the rails in proper alignment when extended into operating positions, we may provide, for the aligning rail sections 70ª where they align with the rail sections 70ᵇ rigid stabilizing and aligning plates, such as shown in Figures 17 and 18. They may consist of a plate 135 welded at 136 upon one rail, such as the rail 70ᵇ, adapted to overlap across the joint structure shown at 137 upon the other aligning rail 70ª and in intimate contact therewith. It is to be understood that the rails 70ª must first be lowered to their extended position, and thereafter the rails 70ᵇ, in order to form proper overlap.

Where the return rails 70ᶜ are aligned with the cargo door return rails 70ᵉ a similar reenforcing member 138 may be welded at 139 to the rail 70ᶜ, for overlap with the joint structure 140 of these rail portions, as shown in Figures 15 and 16. This will necessitate that the cargo door be opened with the return rail in position before the rails 70ᶜ are lowered into operating relation. The joint juncture between the bends in the rails 70ᵈ' and 70ᵉ' is shown at 141 of Figure 6 of the drawings.

Suitable stops are provided for holding the spools B against movement along the track ways at predetermined locations. In the system shown, the step or detent members, designate at 150 (Figures 27 and 28) are located at the ends of the space 151 in Figure 1. This enables the loading of the parachute spools along the rails 70ª against liability of travel of the spools along the rails during placement and transport.

The specific structure of the stops shown in Figures 27, 28 and 29 indicates that they are vertically slidable upon the rails across the runway 74 thereof. They each consist of a body portion 151ª mounted upon the lower wall 73 of a rail 70 and being slidable through a slot provided therethrough. Lateral extensions 152 at the opposite sides of the body portion 151ª hold the stops against removal from their specific locations upon the rails. They are retained by means of reenforcing angle pieces 153 which may be welded to the top and bottom portions of the rail as shown in Figures 27, 28 and 29. The upper flange 72 of the rail may be provided with an opening to receive the upper end of the stop, in the position shown in Figure 28. In this position the detent extends entirely across the runway 74 to prevent spool movement. It may be held in the opening 154 through the reenforcing flange 153 by bowed springs 155.

Referring to control of the spools B during jumping operations, and with particular references to Figures 1, 4, 19 and 26, it will be noted from Figure 19 that the dog receiving channel 76 widens at a location 76ª to a width 76ᵇ which will permit full rotation of the spindle or cylinder portion 80 of the trolley. This permits the spool B to rotate therewith. It will be noted from Figure 3 that this location 76ª lies rearwardly of the rear end of the ramp 35 over which the parachutist jumps in order that when the spools B roll down to the location 76ª they may thereafter freely rotate to deploy the canopy.

Figure 7:
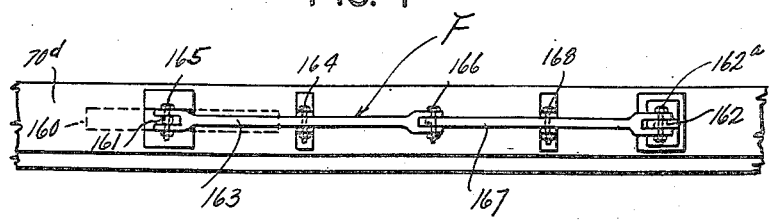
Figure 7 is a fragmentary plan view of a spool control mechanism taken in the direction of the unmarked arrow shown in Figure 4 of the drawings.
Figure 30:
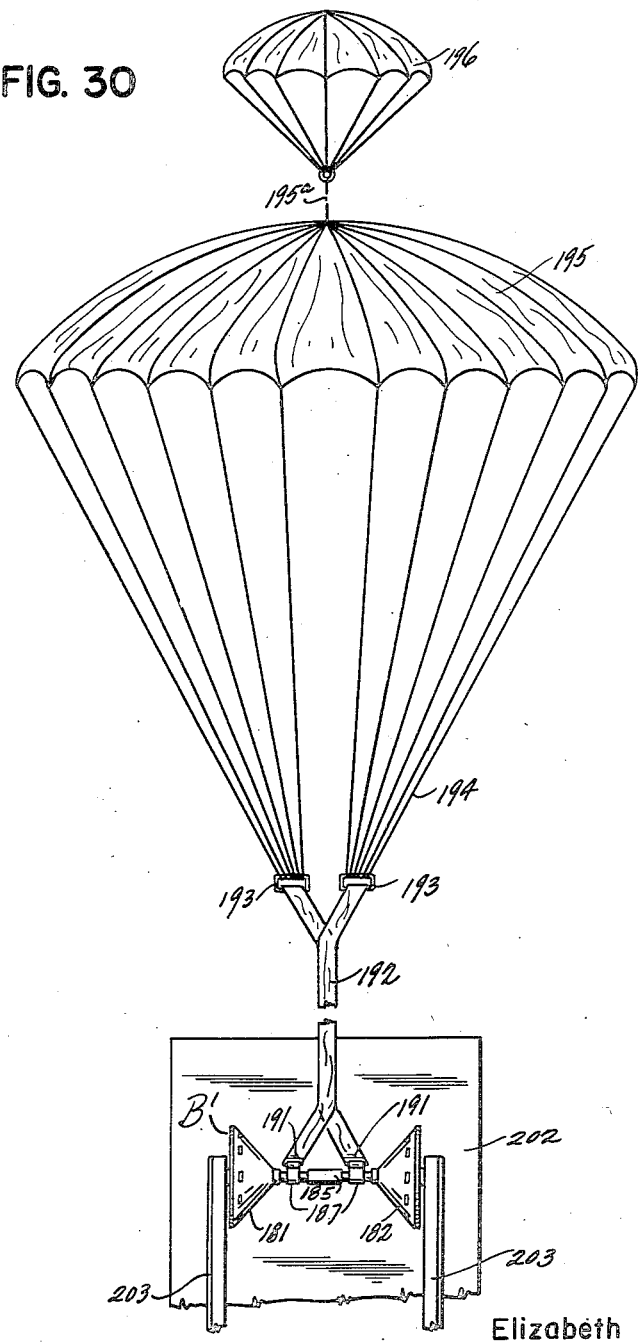
Figure 30 is an inflated elevation of a drogue parachute, showing its connections with respect to a spool of the type used in our system and also showing its relation to a door attached trackway.

It will be well now to describe the operating cycle in order to fully appreciate the control means for the spools shown in Figures 4 and 7. When the parachutist steps off of the ramp 35 his weight breaks the safety ties 62 of the spools shown in Figure 21. The force of the wind and attitude of the aircraft will at once cause the jumper now suspended from the spool B to move to the rear. The trolleys C upon reaching the runway widening point 76ª permits the spool to rotate. Deployment of the shroud lines and canopy will commence as the drag force is increased and the spool B accelerated in movement. When the trolley outer ring 82 reaches the control mechanism shown in Figure 4 it will roll against a narrow flat spring 160, shown depressed in Figure 4, and in dotted lines shown in expanded position. To this spring 160 is attached a plunger 161 guided in a suitable passage in the rail system at point of reenforcement. The plunger 161 operates in a straight line for controlling a detent 162. The latter is slidably mounted in a suitable passageway 163ª in the top of the rail forwardly of the plunger 161. The plunger 161 and the detent 162 are connected by a lever system consisting of a lever 163 pivoted intermediate its ends at 164 upon the top of the rail. One end of the lever 163 is pivoted at 165, to the top end of the plunger 161 and the opposite end of the lever 163 is pivoted at 166 to the forward end of a lever 167. The latter is pivoted intermediate its ends at 168 upon a bracket at the top of the rail, and the fore-end of lever 167 is pivoted at 162ª to the detent 162 for operation of the same.

When the ring 82 of the trolley C reaches the narrow flat spring arm 160, the latter is depressed, forcing the plunger 161 outwardly. Through the levers 163 and 167 and their mounting this causes the detent 162 to be retracted. The trolley C moving past the spring, and the fact that the detent 162 has been retracted, will permit the rearmost empty spool (Figure 4) and its trolley system to move sharply forward, under impact by the adjacent spool to which the jumping parachutist is connected, up and around the rail bends, 70ᵈ' and 70ᵉ' and onto the rails 70ᵉ. This spool is empty; the fall of the parachutist already having freed the canopy structure from it. When the trolley ring 82 of rear spool B (Figure 4) has passed the locus of the spring 160 the spring will cause plunger 161 to be drawn into the runway system and the detent 162 to be extended into the runway 74 for stopping travel of the said rear spool and its trolleys.

It will be noted that the advanced buffer plate 100 of each trolley is provided with a slot 170 which has limitations as to depth and width so as to clear the spring 160 without depressing it, but such limitations are not sufficient for the plate 100 to pass the lowered detent 162. On the other hand the rear buffer plate 101 of each trolley is provided with a wider and deeper slot 171 which enables this buffer plate to pass not only the spring 160 without depressing it, but also to pass the lowered detent 162. Thus, after the front trolley and spool, (Figure 4) has been shot around the bend of the rail, and immediately subsequent to passing of the outer trolley ring of the rear spool B past spring 160, the detent 162 will be lowered to the dotted line position shown in Figure 4 where it will stop the rear trolley C (Figure 4). The rear spool just stopped by the detent 162 will remain in place until the next jumper continues the advance of his trolleys and spool to the point where they will repeat the operation above described. It will be aparent from Figure 4 that the hinges in the trolley buffer rods will permit the trolleys to pass around the bend in the extended track system.

The bridle strap 56 freely drops from the spool.

Referring to Figures 3 and 4, it will be noted that the runways of the rail sections 70ᵉ are provided with detents or stops 175 to prevent return rolling of the trolleys and spools. Each includes a plunger 176 spring urged into position to prevent return roll of the spools. A flexible strip 175ª enables the trolley to depress the plunger 176. A plurality of these stops may be positioned upon the trackways 70ᵉ, as shown in Figure 3.

It is believed that operation, both insofar as packing and deployment operation of the canopy, will be apparent from the foregoing. Prior to a parachute jumping mission, the complementary rails 70ª will be lowered as above described in each lane, and the spools and trolleys loaded in position between the stops 150 at the space 151, which may be of any length desired. The trolley spool assembly is located so that a counterclockwise rotation of the spool will unwind the canopy. When the desired number of spools and trolleys have been placed upon the rail sections 70ª the front trolley stop 150 is pushed into "stop" position.

The troops board the aircraft wearing harnesses 182 (Figure 1) fitted with suitable canopy releases 180 and take the seats provided. Immediately prior to arrival at the drop zone, the pilot or crew member lowers the ramp 35 to a horizontal position, and the cargo door 36 is raised. The exterior rail doors 123 are lowered. The rail arms supporting rails 70ᵇ and 70ᶜ are lowered to extended position, as shown in full lines in Figure 9ª and rail portions 70ˣ are extended. The parachutists stand and the spools are moved by pulling down the rear trolley stop 150 on track 70ª, shown in Figure 1 so that a spool is directly above each standing parachutist. The parachutist then grasps the riser webs hanging from his spool and connects the rings 52 of the free ends of the webs, to the main lift webs of the harness 182ª, at the canopy releases 180. The latter may be of the type shown in U. S. Patent 2,473,554. The parachutists then move to the position for jumping. The operation of deployment has been above described in connection with advancing the spools through the control mechanism F.

After the jumping operation, the trolleys on rail sections 70° are removed. The stop 150 shown in Figure 3, aft of the joint 138 (Figure 3) is moved to spool restraining position. The cargo door and ramp are then closed. A member of the crew reaches through the hatch opening 131 (Figure 4). He lifts the detent 162 and grasps the front buffer of the last spool remaining on the track 70ᵈ and pulls it inside of the cargo door. The stop 150 may then be opened to remove the spool from the tracks 70ᵈ. These tracks are then folded by closing the track doors on the cargo doors.

Referring to the system of deploying the parachute, apex first, as shown in Figures 30 to 34 inclusive, trolleys similar to that above described may be employed and a different type spool construction B' is used, in which the spool includes an axle 180ª having spool flanges 181 and 182 keyed by set screws 183 at the ends thereof so as to provide axial extensions 184 therebeyond. The latter corresponds to an axle extension above described for the spool B. An intermediate tube 185 is keyed to the axle by set screws 186 and at each side thereof parachute strap connectors 187 are rotatably supported by antifriction means 188 upon the axle structure. These connectors 187 are provided with extensions 190 for attachment to connector links 191 of harness or webbing 192. The latter has connector links 193 on the outer ends thereof for attachment to the divided shroud lines 194 of the parachute canopy 195. The latter has a pilot parachute 196 of conventional construction.

Referring to the packing and deployment of the drogue canopy, the parachute canopy and shroud lines are extended upon the table and folded the same as above described, with the exception that the main parachute is connected to the tension drum cable hooks. A turn of the harness straps is made until it tightens upon the axle portion 195. The tension drum cable hooks are pulled out and engaged in the bridle loop 195ª. The spool is then wound clockwise. Prior to releasing the tension drum hooks the bridle loop 195ª is tied with break cords through spool slots 197. The pilot canopy is then tied with break cords secured in the spool slots 197. A small shot bag 200 is attached to the bridle loop 201 of the pilot canopy.

The aircraft A' is provided with a rear opening and a door 202 therefore. This door 202 is provided with trackways 203 similar to the trackways above described. The trolleys 204, shown in dotted lines in Figure 34, are placed on the ends of the axle and inserted into the rails 203. With the door 202 closed the spool will be held in forward position upon the rails regardless of the attitude of the airplane by any suitable mechanism such as a cross bar. As the pilot approaches for a landing he opens the door by a hydraulic or other means. This enables the spool to move down to the ends of the rails 203 which are closed. The impact of the trolley buffers striking the closed ends of the rails causes the weight of the shot bag to break the safety cords on the pilot parachute and exposing the pilot parachute to the slip stream of air. The force of deployment of the pilot parachute will snap the break cords on the bridle loop of the main canopy. The continued drag force of the pilot parachute will cause complete deployment of the main canopy. The races on the rails may be wider at the bottom of the rails to permit full rotation of the spool. Through the rotatable connectors 191 continued rotation of the spool after deployment of the main parachute may be continued.

The fact that the particular airplane of this application shows a movable ramp is not important, since some types of transports have the cargo door closing directly into the airplane floor, and of course other variations may be made to the design of the airplane and its closure for the purpose of accommodating the improved spool system of parachuting herein described.

Various changes may be made to the size, shape and form of the inventions herein shown and described, without departing from the spirit of the inventions or scope of the claims.

We claim:

1. In a system for deployment of parachutes from aircraft the combination of an aircraft having a trackway system therein leading towards a discharge opening in the aircraft, a spool, trolley means movable along the trackways for supporting the spool for movement therewith along the trackways, and a parachute canopy collapsibly wound upon said spool having means thereon for attachment to a load.

2. A system of parachuting as described in claim 1 wherein means are provided to permit rotation of the spool only after a predetermined travel along the trackway system to said discharge opening.

3. A system of parachuting as described in claim 1 wherein a plurality of canopy supported spools are provided for said trackway with means provided to regulate the relatively spaced non-interfering positioning and movement of said spools along the trackway with respect to each other.

4. A spool system for deployment of parachutes from aircraft comprising in combination with an aircraft having a discharge opening therein, trackways in said aircraft with a line leading from fore to aft and a return line leading from the rear to the fore, spools having spirally wound parachute canopies thereupon, trolley means ridable along said trackways for rotatably supporting said spools, and control means for releasably regulating the positioning of the spools at the discharge opening for movement along the trackways to the return line of the trackways.

5. In a system for deployment of parachutes from aircraft the combination of a spool having a parachute canopy and shroud lines spirally wound thereon under tension, and break cord means for holding the spirally wound tensioned position of the canopy and lines upon said spool.

6. A system as described in claim 5 in which trolleys are provided for releasable connection upon the axial ends of the spool.

7. In a spool system for deployment of parachutes from aircraft the combination of a trackway including a pair of complementary rails provided with runways therealong, trolleys rotatably mounted in said runways including portions having means cooperating with the rails to hold said portions against rotation until they reach a predetermined position along said rails, parachute spools having parachutes wound spirally thereon, and means for releasable connection of the spools to the said portions of the trolleys.

8. In apparatus for the deployment of parachutes from aircraft comprising a track having a runway, a spool having means thereon for spirally winding and holding a parachute canopy releasably thereon, rotatable trolleys, means rotatably mounting said trolleys upon the ends of said spool for axial rotation of the spool, said trolleys being mounted in said runway for rotatable travel therealong.

9. In a system for deployment of parachutes from aircraft the combination of a pair of rails having runways therealong, a plurality of spools, trolleys rotatably supported upon said rails in said runways having means thereon for releasably attaching a spool at its ends for supporting said spools between said rails spacing means upon said trolleys for holding said spools at predetermined non-interfering distances apart, and means on said rails and said trolleys for holding the spool supporting portions of the trolleys against rotation for predetermined travel therealong including means to release said portions for free rotation upon said rails at a predetermined deploying location.

10. In combination with an aircraft having a parachute opening therein, a trackway in said aircraft, spools having connection upon said trackway for travel therealong, parachute canopies spirally wound upon each of the spools, and load connected harnesses having release means for releasable connection with the canopies whereby the canopies and spools will be supported by said trackways independent of harness support.

11. As an article of manufacture a trolley for use in parachuting rail systems of aircraft comprising an outer rotatable track engaging ring, a central parachute spool connecting ring, an intermediate ring, and anti-friction means rotatably supporting the intermediate ring upon the central ring and the outer ring upon the intermediate ring.

12. A trolley as described in claim 11 in which buffer extensions are provided upon the front and rear thereof connected to said intermediate ring and having hinges intermediate the ends of the extension to permit the buffer extensions to swing relative to the trolley for following a curved trackway system.

13. In a spool system for deployment of parachutes from aircraft for the discharge of troops and cargo the combination of an aircraft fuselage having a chamber therein, foldable trackways mounted in said compartment upon said aircraft comprising a series of complementary rails, trolleys ridably supported by said rails, and spools for releasable connection with the trolleys to support the spools rotatably upon said rails, said spools each having means thereon for spirally winding of a parachute canopy thereon.

14. In combination with an aircraft having a chamber therein for cargo and troop transportation, said aircraft having a discharge opening therein, closure means for the discharge opening, a trackway system mounted in said chamber including a portion mounted upon said closure means, parachute spools having parachute canopies spirally wound thereon, and means for movably supporting the spools for travel along said rails including means for holding the spools against relative rotation until they reach a point in the trackway system at said discharge opening.

15. In a spool system for deployment of parachute canopies from aircraft for drop supporting troops and cargo loads the combination of a rail line, a trolley movably mounted upon the rail line for movement therealong, a spool rotatably supported upon said trolley, a parachute canopy spirally wound upon said spool, said trolley including a spool attachable rotatable portion, and means upon the said rotatable portion of the trolley and the rail line for holding said rotatable portion of the trolley against rotation until it reaches a predetermined position along said rail line.

References Cited in the file of this patent

UNITED STATES PATENTS

| 2,363,732 | Jenkins | Nov. 28, 1944 |
| 2,390,230 | Trusty | Dec. 4, 1945 |
| 2,425,972 | Watter | Aug. 19, 1947 |
| 2,426,862 | Cunningham | Sept. 2, 1947 |
| 2,525,844 | Weaver | Oct. 17, 1950 |

FOREIGN PATENTS

| 61,000 | France | Aug. 11, 1954 |
| | (Addition to No. 975,951) | |
| 581,485 | France | Sept. 29, 1924 |
| 1,035,449 | France | Apr. 15, 1953 |